United States Patent [19]
Repstien et al.

[11] Patent Number: 5,846,133
[45] Date of Patent: Dec. 8, 1998

[54] ADJUSTABLE TORQUE CLUTCH FOR REMOTE CONTROLLED CIRCUIT BREAKERS

[75] Inventors: Terry Dean Repstien, Cedar Rapids; Raed Jamal Abu-Hijleh, Coralville, both of Iowa

[73] Assignee: Square D Company, Palatine, Ill.

[21] Appl. No.: 889,705

[22] Filed: Jul. 8, 1997

Related U.S. Application Data

[63] Continuation of Ser. No. 525,804, Sep. 8, 1995, abandoned.
[51] Int. Cl.⁶ ........................................ F16D 7/02
[52] U.S. Cl. ............................. 464/45; 464/46
[58] Field of Search .................. 464/30, 41, 42, 464/43, 44, 45, 46, 47, 48

[56] References Cited

U.S. PATENT DOCUMENTS

| | | | |
|---|---|---|---|
| 2,561,830 | 7/1951 | Vanderzee | 464/45 |
| 3,955,622 | 5/1976 | Thackston . | |
| 3,987,687 | 10/1976 | Bland et al. . | |
| 4,060,010 | 11/1977 | Henden | 464/30 |
| 4,445,876 | 5/1984 | Entrup | 464/46 |
| 4,561,855 | 12/1985 | Kondo | 464/47 |
| 4,921,083 | 5/1990 | Etscheidt . | |

FOREIGN PATENT DOCUMENTS

| | | | |
|---|---|---|---|
| 366300 | 2/1932 | United Kingdom | 464/47 |
| 2056589 | 3/1981 | United Kingdom | 464/46 |

*Primary Examiner*—Eileen Dunn Lillis
*Attorney, Agent, or Firm*—Larry I. Golden; Kareem M. Irfan

[57] ABSTRACT

An adjustable torque clutch assembly is provided for use in a motor operator. The clutch assembly includes a cylinder ring disposed between upper and lower clutch plates and houses a pair of friction discs, a drive plate disposed between the friction discs, and a spring for forcing the friction discs together to create a frictional coupling force between the drive plate and the friction discs. The exact amount of frictional force is determined by the distance between the upper and lower plates. A rubber gasket is disposed between the housing and one of the clutch plates for allowing adjustment of the distance between the clutch plates, thereby allowing the frictional force, and hence the overall clutch torque to be adjusted. A plurality of screws are provided to secure the clutch plates together once the distance between them, and hence the frictional force has been adjusted to a desired amount.

8 Claims, 3 Drawing Sheets

ADJUSTABLE TORQUE CLUTCH FOR REMOTE CONTROLLED CIRCUIT BREAKERS

CROSS REFERENCE TO RELATED APPLICATION

This is a continuation of U.S. patent application Ser. No. 08/525,804, filed Sep. 8, 1995 and entitled "Adjustable Torque Clutch for Remote Controlled Circuit Breakers" now abandoned.

FIELD OF THE INVENTION

This invention relates generally to a clutch assembly and, more specifically, to an adjustable torque clutch assembly for use in a circuit breaker motor operator.

BACKGROUND OF THE INVENTION

Circuit breakers may be controlled remotely by a motor operator. These motor operators typically utilize a torque limited module to couple a drive motor to a circuit breaker operating mechanism. Such a torque limited module includes a clutch that is centered on a drive shaft. One such clutch is disclosed in U.S. Pat. No. 4,921,083 entitled "Clutch Module with Predetermined Torque". This clutch is precisely loaded by means of a centering and spacing ring in the form of a cylinder. Upper and lower module plates embrace the spacer ring, which houses friction elements being loaded by a pair of springs. The friction elements include a pair of friction discs, separated by a spacer or slip disc, and a drive plate. The springs control the clutch frictional force between the friction elements thereby controlling the torque of the clutch assembly. The motor is supplied with a current pulse of duration longer than the time required to fully operate the circuit breaker. The friction elements slip when the circuit breaker operation is completed thereby permitting the motor to overrun without damage.

With such prior art clutches, the torque of the clutch assembly is determined by the height of the centering ring, the thickness of the friction elements and the spring rate of the springs inside the centering ring. In order to achieve a pre-determined torque, these clutch components are designed for and must be precisely fabricated to tight tolerances. This type of clutch design has the disadvantages of increased cost because of the high tolerance requirement and the inability to adjust the clutch torque at assembly time for any reason, particularly if out-of-tolerance components are to be accommodated. Accordingly, there exist a need for a clutch assembly which provides the desired pre-determined torque without requiring tight manufacturing tolerances, and also permits the clutch torque to be precisely adjusted at the time the clutch is assembled.

SUMMARY OF THE INVENTION

It is a general object of the present invention to provide a clutch for limiting the torque applied in a circuit breaker operating mechanism.

It is a more specific object of the present invention to provide an adjustable torque clutch, which provides the ability to adjust the torque at the time the clutch is assembled.

It is another object of the present invention to provide a method for assembling an adjustable torque clutch such that the torque is adjusted at the time the clutch is assembled.

These objects are realized according to this invention by providing a novel clutch assembly having a gasket and a method of assembling to provide a clutch assembly with the desired torque without requiring the components to be manufactured to tight tolerances.

In accordance with a preferred embodiment the clutch assembly includes a cylinder ring which is disposed between upper and lower clutch plates and houses a pair of friction discs, a drive plate disposed between the friction discs, and a spring for forcing the friction discs together to create a frictional coupling force between the drive plate and the pair of friction discs. The exact amount of frictional force is determined by the distance between the upper and lower plates. Torque adjustment means in the form of a rubber gasket is disposed between the housing and one of the pair of clutch plates for adjusting the distance therebetween, thereby allowing the frictional force, and hence the overall clutch torque to be adjusted. A plurality of screws are provided to secure the clutch plates together once the frictional force is adjusted to a desired amount.

The present invention also provides a method for assembling a clutch assembly to take advantage of the adjustable torque mechanism. The method includes sequentially placing the housing, the pair of plates, the drive plate, the friction disc, the spring and the rubber gasket into an assembly fixture. Next, a load is applied to the pair of plates thereby compressing them together. The frictional force is adjusted until a pre-determined frictional force is achieved and then the pair of plates are secured together.

BRIEF DESCRIPTION OF THE DRAWINGS

Other objects and advantages of the invention will be apparent from the following detailed description and the accompanying drawings in which.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

Figure 1:
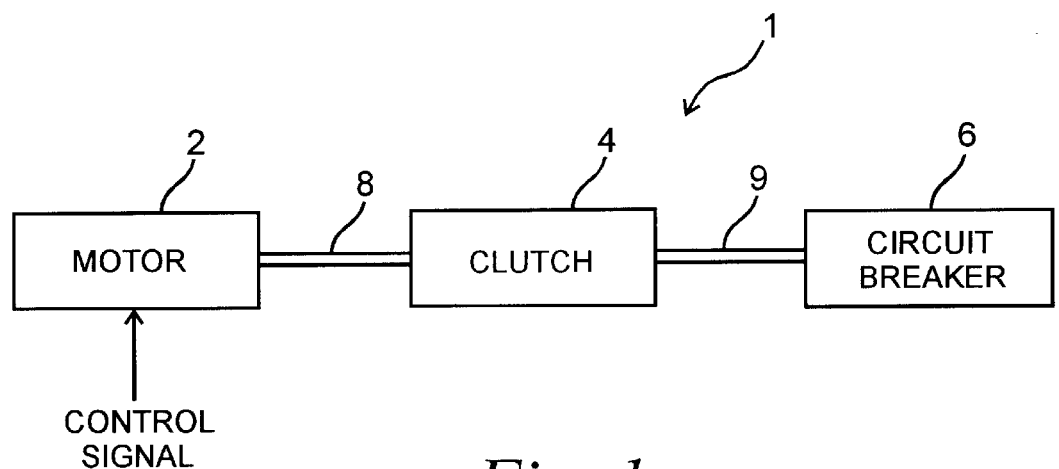
FIG. 1 is a block diagram of a circuit breaker remote control arrangement using a motor operator to drive a circuit breaker through a clutch assembly.

Referring first to FIG. 1, there is shown a remotely control circuit breaker arrangement 1 which uses a drive motor 2 to operate through a clutch assembly 4 to drive a circuit breaker 6. The motor 2 is activated by a control signal and its driving motion is transmitted to the clutch assembly 4 through a motor shaft 8 coupling the motor 2 to the clutch assembly 4. The clutch assembly 4 transfers the rotation of the motor shaft 8 through a drive shaft 9 to the circuit breaker 6 in order to realize the necessary remote control thereof. In particular, the drive shaft 9 is used to rotate an operating mechanism arm (not shown) of the circuit breaker 6 through a limited angle for opening (or closing) electrical circuits completed therethrough. The clutch assembly 4 limits the torque applied to the drive shaft 9 and its use in motor operators for driving remote controlled circuit breakers is well known. For instance, U.S. Pat. No. 4,921,083 entitled "Clutch Module with Predetermined Torque", which is also assigned to the assignee of the present application covers an illustrative motor operator arrangement, and the disclosure therein is incorporated herein by reference.

Figure 2:
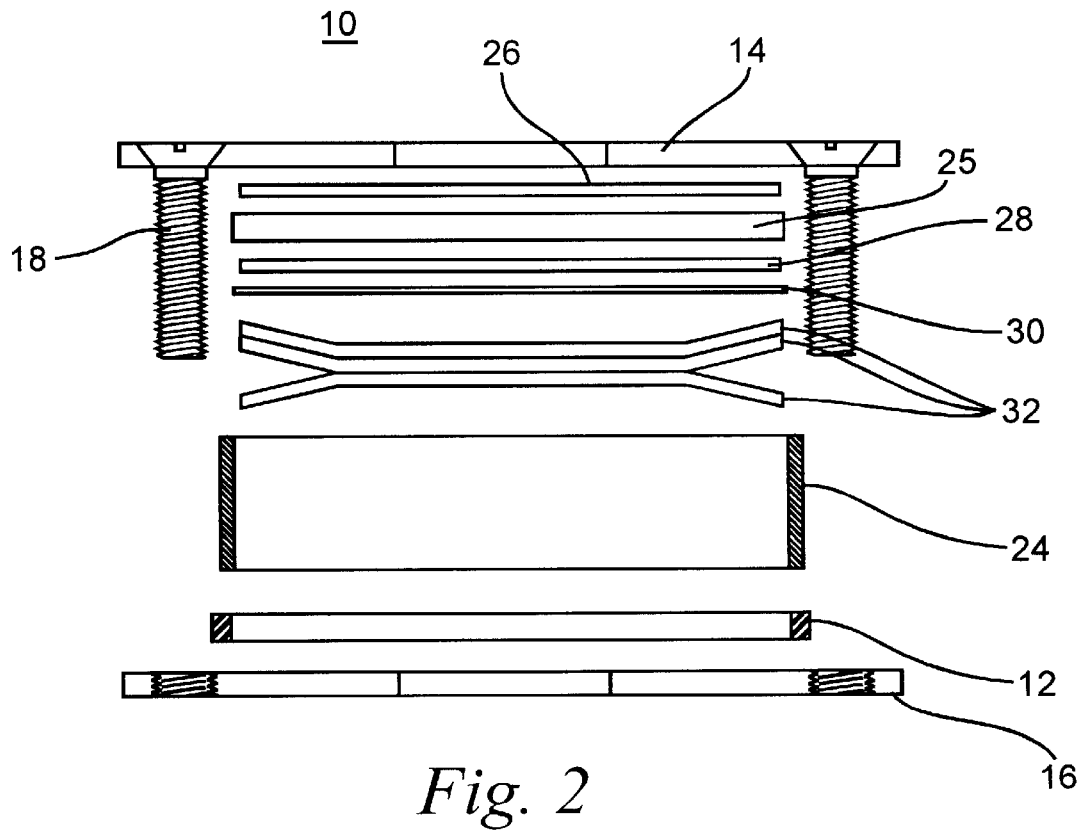
FIG. 2 is an exploded view of a clutch assembly in accordance with the present invention.

Referring now to FIG. 2, there is shown an improved clutch assembly 10 is according to a preferred embodiment of the present invention having a novel rubber gasket 12 for providing the ability to adjust the torque of the clutch assembly 10. The other components of the clutch assembly 10 are not believed to be necessary for the understanding of the present invention, however, the reader may refer to U.S. Pat. No. 4,921,083 which has been previously incorporated by reference.

The clutch assembly 10 components are bounded by an upper clutch plate 14 and a lower clutch plate 16. The upper and lower clutch plates 14, 16 are secured by a plurality of circularly disposed screws 18 which pass through appropriate holes 20 in the upper clutch plate 14 and into threaded apertures 22 in the lower clutch plate 16. The rubber gasket 12 is disposed adjacent to the lower clutch plate 16 and a cylindrical centering ring 24 is disposed between the rubber gasket 12 and the upper clutch plate 14. Friction elements are disposed inside the centering ring 24 which comprise a drive plate 25 disposed between a pair of annular friction discs, a top friction disc 26 and a bottom friction disc 28. The drive plate has a central opening which is adapted for engagement with the drive shaft 9. An annular slip or spacer disc 30 separates the friction elements from a set of Belleville washers or springs 32.

Figure 3:
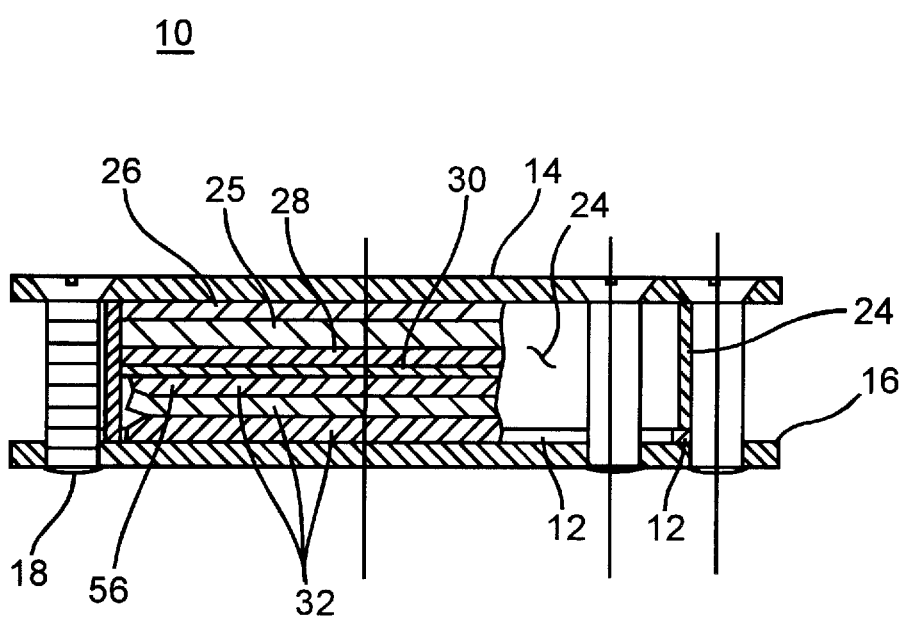
FIG. 3 is a partial view showing the assembled clutch assembly.

FIG. 3 illustrates the assembled clutch assembly 10 wherein the various clutch components are squeezed together between the upper and lower clutch plates 14, 16, by virtue of the spring force of the Belleville springs 32 and tightening of the screws 18, to fit wholly within the confines of the centering ring 24 and the rubber gasket 12. The rubber gasket 12 is disposed between the centering ring 24 and the lower clutch plate 16 and acts as a resilient spacer thereby allowing the distance between the upper and lower clutch plates 14, 16 to be adjusted. During assembly of the clutch assembly 10, this arrangement allows the centering ring 24 to be pressed against the rubber gasket 12 until the desired torque is achieved. After the desired torque is achieved, the screws 18 are tightened to a range of 15–20 lb-in. thus forcing all of the clutch components within the confines of the centering ring 24 and rubber gasket 12. As a result, the centering ring 24 not only serves to maintain the various clutch components in alignment, it establishes, in combination with the rubber gasket 12, a consistent torque load for the clutch assembly 10.

The torque that the clutch provides is defined by the frictional force between the friction elements. The frictional force is defined by the amount of compression of the springs 32 which is defined by the distance between the upper and lower clutch plates 14, 16. The rubber gasket 12 is provided to allow this distance to be adjusted, and also functions as a seal to prevent any contaminants from entering into the clutch assembly 10.

The height of the centering ring 24 is such that when the upper and lower clutch plates 14, 16 are squeezed together, without the rubber gasket 12 disposed between the centering ring 24 and the lower clutch plate 16, the resulting torque would be too high. The height of the rubber gasket 12 is sized such that the combination of the centering ring 24 and the rubber gasket 12, in a non-compressed state, the resulting torque would be too small. The optimal torque is achieved when the centering ring 24 is pressed into the rubber gasket 12. The method that is utilized to achieve the optimal torque will be discussed hereinbelow.

The rubber gasket 12 is preferably made of a buna-n material having a hardness in the range of 65–75 Durometer Shore A. The rubber gasket is available as part number 035S (or equivalent) from Wolf Creek Rubber Company of Beaman, Iowa.

The operation of the friction elements is similar to that disclosed in U.S. Pat. No. 4,921,083. By virtue of the force imposed by the Belleville springs 32 on the friction elements, frictional forces are developed between the surfaces of the friction discs 26, 28 and the drive plate 25. The friction discs 26, 28 and the Belleville springs are selected to develop a pre-determined torque in a pre-determined range. The minimum torque is the minimum amount of torque applied to the drive shaft 9 (FIG. 1) that is able to rotate the circuit breaker operating mechanism arm (not shown). The maximum torque is the highest torque value that may be applied to the circuit breaker operating mechanism arm before damage occurs to the circuit breaker 6. For this application the pre-determined torque range is 380–640 lb-in. At torques greater than the predetermined torque, the friction elements slip and rotation of the of the motor shaft 8, does not result in rotation of the drive shaft 9. For loads less than the pre-determined torque, rotation of the motor shaft 8 causes rotation of the drive plate 25 thereby causing rotation of the drive shaft 9. The rotation of the drive shaft 9 angularly rotates the operating mechanism arm of the circuit breaker 6. When the circuit breaker operating mechanism arm reaches its fully open or fully closed position, the load imposed on the drive shaft 9 becomes greater than the frictional force or torque of the clutch assembly 10 and the friction elements slip thereby permitting the motor to over-run without causing damage to the motor or the circuit breaker.

Figure 4:
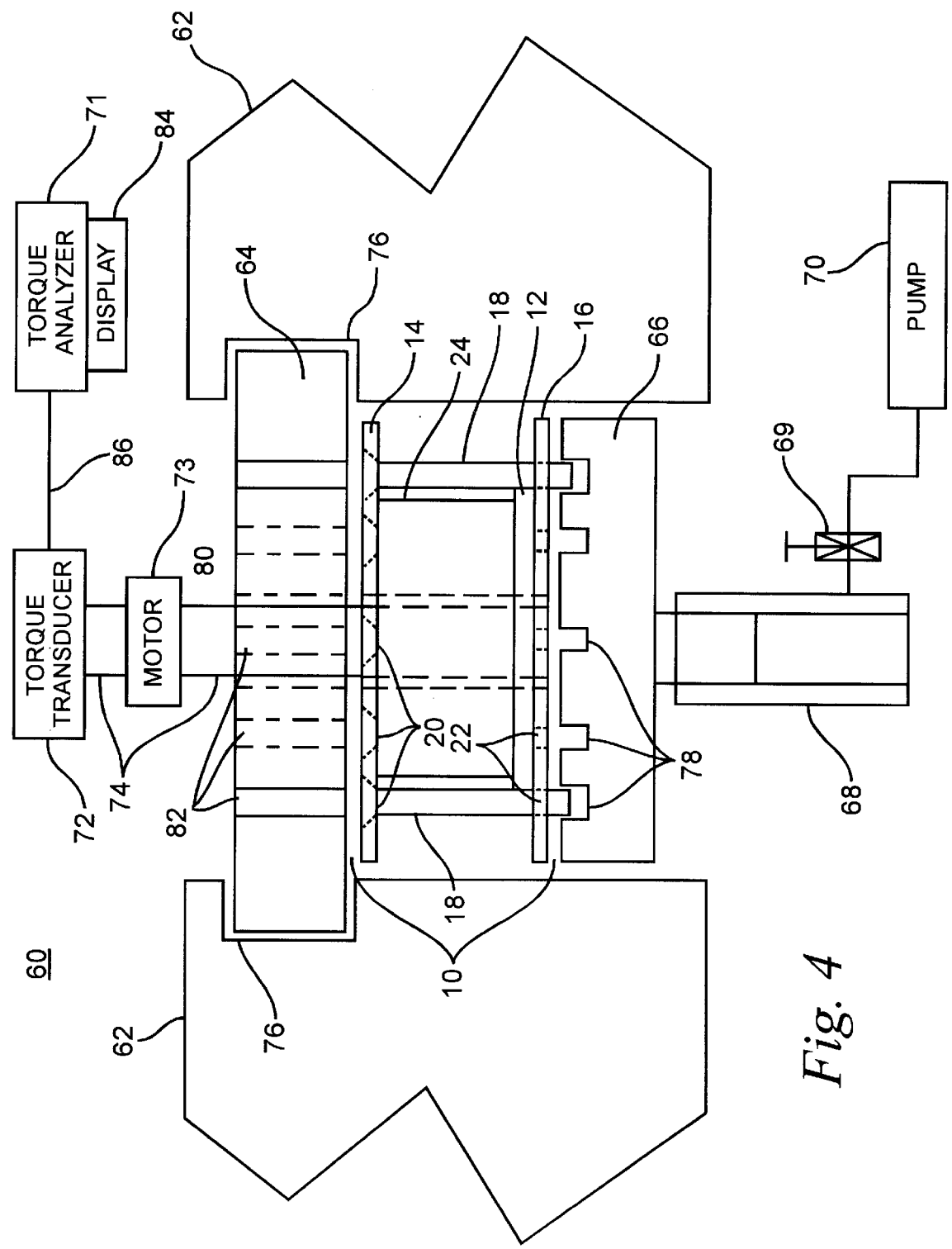
FIG. 4 is a side view of an assembly fixture and the clutch assembly showing the method of assembling the clutch assembly.

FIG. 4 shows an assembly fixture 60 according to the present invention for torque adjustment and assembly of the clutch assembly 10. The assembly fixture 60 includes two sidewalls 62, a top fixture plate 64, a bottom fixture plate 66, a hydraulic cylinder 68, a valve 69, a pump 70, a torque analyzer 71, a torque transducer 72, a motor 73, and a torque tester shaft 74. The pump 70, valve 69 and hydraulic cylinder 68 are available as model nos. TS-10251, VC-20L and PAC-3002SB, respectively, from Enerpac of Butler, Wis. The torque analyzer 71 and the torque transducer 72 are available as model nos. 4AC and TT150, respectively, from Sturtevant Richmont of Franklin, Ill. The motor is available as model no. PAM02 from Square D Co. of Cedar Rapids, Iowa.

Each of the sidewalls 62 has a slot 76 to slidably accommodate the top plate 64. The bottom fixture plate 66 is coupled to the cylinder 68 which is coupled to and controlled by the pump 70 through the valve 69. The bottom fixture plate 66 has a plurality of slots 78 spaced to correspond to the threaded apertures 22 in the lower clutch plate 16 to accommodate without any interference the screws 18 projecting therethrough. The top fixture plate 64 is shaped similar to the upper clutch plate 14 and has a center hole 80 and a plurality of clearance holes 82 spaced in corresponding relationship to the holes 20 in the upper clutch plate 14 to allow access to the screws 18. The center hole 80 allows the torque tester shaft 74 to pass therethrough and engage the drive plate 25 (FIG. 7). The shaft 74 is coupled to both the motor 73 and the torque transducer 72. The motor 73 rotates the shaft 74 and the torque transducer 72 measures the torque provided by the torque assembly 10. The torque analyzer 71 has a digital display 84 and is coupled to the torque transducer 72 through a cable 86.

The preferred method for assembly and torque adjustment, according to this invention, will now be described with reference to the clutch assembly 10. The top fixture plate 64 is first removed from the assembly fixture 60 by sliding it out of the slots 76. The lower clutch plate 16 is then inserted into the assembly fixture 60 followed sequentially by the rubber gasket 12, the centering ring 24, the pair of Belleville springs 38, the third Belleville spring 56, the spacer disc 30, the bottom friction disc 28, the drive plate 25, the top friction disc 26, the upper clutch plate 14 and the screws 18. The top fixture plate 64 is then slid into the slots 76 and over the clutch components. As shown in FIG. 4, the clutch assembly 10 is now sandwiched between the top fixture plate 64 and the bottom fixture plate 66. Next, the shaft 74 is inserted into the clutch assembly 10 until it engages the drive plate 25 (FIG. 2). The valve 69 is opened and the hydraulic cylinder 68 is supplied with a pre-determined amount of air/oil from the pump 70 so that the cylinder 68 applies a pre-determined load to the lower clutch plate 16 thereby pressing the centering ring 24 into the rubber gasket 12. Next, the motor 73 rotates the torque tester shaft 74 and the torque transducer 72 measures the frictional force or torque of the clutch assembly 10. The torque analyzer 71 reads the measured torque value from the torque transducer 72 through the cable 86 and displays the torque value on the display 84. If the measured torque value is lower than 380 lb-in., the pump 70 is adjusted so that the cylinder 68 applies a greater load to the clutch assembly 10. If the measured torque value is greater than 640 lb-in., the pump 70 is adjusted so that the cylinder 68 applies a decreased load to the clutch assembly 10. The torque that the clutch assembly 10 applies to a load is adjusted by changing the load that the cylinder 68 applies until the measured torque is in the range of 380–640 lb-in. After the desired torque is achieved, the screws 18 are tightened to a range of 15–20 lb-in. This range provides a sufficient amount of hold force to hold the clutch assembly 10 together while not further pressing the centering ring into the rubber gasket. After the screws 18 are tightened, the clutch assembly 10 is removed from the assembly fixture 60 and a glue is applied to threads of the screws exposed below the lower clutch plate 16 thereby further locking them in place. The glue is part no. TL-290 GREEN from Loctite Corporation which is available from Globe Machinery & Supply of Cedar Rapids, Iowa.

While there have been shown and described what is at present considered the preferred embodiment of the invention, it will be obvious to those skilled in the art that various changes and modifications may be made therein without departing from the scope of the invention as defined by the appended claims. For example, enhancements may be made to the assembly fixture to automate the adjustment process, such as, automating the process with a programmable logic controller. Additionally, the position of the rubber gasket may be changed such as by positioned adjacent to the upper clutch plate rather than the lower clutch plate.

What is claimed is:

1. An adjustable-torque clutch assembly for use in a circuit breaker motor operator, said clutch assembly comprising:

first and second clutch plates separated by an adjustable distance;

a housing;

clamping means for clamping said housing between said first and second plates;

drive means, disposed in said housing, for rotating a shaft;

a friction disc, disposed adjacent to said drive means;

spring means, disposed within said housing, for forcing said drive means and said friction disc together thereby creating a frictional force between said drive means and said friction disc;

wherein said frictional force is a function of said adjustable distance and is altered by changing said adjustable distance; and a resilient spacer, disposed between said housing and one of said first and second clutch plates, for allowing said housing to be compressed therein and allowing said adjustable distance to be altered.

2. A clutch assembly according to claim 1, wherein said housing includes a cylinder ring.

3. A clutch assembly according to claim 1, wherein said spring means includes at least one Belleville spring.

4. A clutch assembly according to claim 1, wherein said resilient spacer includes a rubber gasket.

5. A clutch assembly according to claim 4, wherein said frictional force is increased by compressing said housing means into said rubber gasket.

6. A method for assembling a clutch assembly which includes a housing secured between a pair of clutch plates for housing a drive plate frictionally coupled to at least one friction disc by a frictional force, at least one spring biasing the friction disc toward said drive plate to create the frictional force, and a rubber gasket for adjusting the distance between said pair of clutch plates so as to adjust the frictional force, said method comprising the steps of:

sequentially placing said housing, said pair of plates, said drive plate, said friction disc, said spring and said rubber gasket into an assembly fixture;

applying a predetermined load to said pair of clutch plates to compress said pair of clutch plates together and pressing said housing into said rubber gasket;

adjusting the distance between said clutch plates by increasing or decreasing the distance the housing is pressed into the rubber gasket in order to realize a predetermined force value of said frictional force; and securing said pair of plates together.

7. The method of assembling a clutch according to claim 6, wherein the step of adjusting the friction force includes:

measuring the frictional force; and increasing the load to said clutch plates if the measured frictional force is less than the predetermined force value or reducing the load if the measured frictional force is greater than the predetermined force value.

8. A circuit breaker comprising:

a housing; and a motor operator, coupled to said housing, having a clutch assembly, wherein said clutch assembly comprising:

first and second clutch plates separated by an adjustable distance;

a cylinder ring;

clamping means for clamping said cylinder ring between said first and second plates;

drive means, disposed in said cylinder ring, for rotating a shaft;

a friction disc, disposed adjacent to said drive means;

a spring, disposed within said housing, for forcing said drive means and said friction disc together thereby creating a frictional force between said drive means and said friction disc, wherein said fictional force is a function of said adjustable distance; and a gasket, disposed between said cylinder ring and one of said first and second clutch plates, said cylinder ring being compressed into said gasket for allowing said adjustable distance to be adjusted thereby adjusting said frictional force.

* * * * *